United States Patent Office 3,488,163
Patented Jan. 6, 1970

3,488,163
PREPARATION OF CHLORODIFLUORAMINE
Emil A. Lawton, Woodland Hills, and John Q. Weber, Topanga, Calif., assignors to North American Rockwell Corporation, a corporation of Delaware
No Drawing. Continuation-in-part of application Ser. No. 36,238, June 15, 1960. This application Aug. 30, 1961, Ser. No. 135,413
Int. Cl. C01b 21/18, 21/52; C01c 3/00
U.S. Cl. 23—356                                                     1 Claim This invention relates to a novel method for the preparation of chlorodifluoramine and the application is a continuation-in-part of our prior co-pending application, Ser. No. 36,238, now Patent 3,077,377 filed June 15, 1960, and entitled, "Preparation of Chlorodifluoramine."

Chlorodifluoramine is a compound which is used as a starting compound for the preparation of NF-compounds such as, for example, tetrafluorohydrazine, a very high energy oxidizer. Chlorodifluoramine is also used in the preparation of other oxidizers and monopropellants. It is also a high energy oxidizer in its own right.

It is an object of this invention to provide a method for the preparation of chlorodifluoramine. Other objects will become apparent from the following detailed description of the invention.

In application, Ser. No. 36,238, now Patent 3,077,377 we disclosed the preparation of chlorodifluoramine by the reaction of difluoramine with hydrogen chloride. An embodiment of the invention disclosed in the prior co-pending application is the reaction between $HNF_2$ and HCl in an aqueous solution in the presence of chlorine and an alkali metal chloride. We stated in the prior application that with water as a diluent the reaction not only proceeded at a more uniform rate but was much more rapid. An added advantage of using the water as a diluent is the increased safety factor, since $HNF_2$ in water is much less susceptible to explosive decomposition. Another advantage of the aqueous reaction stated in our prior application is that no other complexing chemical need be added in order to obtain chlorodifluoramine in pure form.

It is further stated in our prior co-pending application that in carrying out the reaction in a water solution, an excess of water is employed since it serves mainly as a diluent. There is no particular relation between the concentrations of the hydrogen chloride, the chlorine, and the alkali metal chloride that need be observed so long as the concentrations of each are sufficient for the formation of chlorodifluoramine upon the addition of difluoramine. For example, good results are obtained when the mol ratio of $HCl$-to-$Cl_2$ varies from about 1:5 to about 5:1. The same holds true for the mol ratio of HCl-to-MCl, wherein M represents an alkali metal. The amount of difluoramine added to the solution preferably does not exceed the amount of HCl present in terms of mol units in order to get maximum conversion of the $HNF_2$ to $ClNF_2$. Therefore, good results are obtained, for example, when the mol ratio of $HCl$-to-$HNF_2$ varies from about 10:1 to about 1:1. In order to obviate separation of the product from atmospheric gaseous components or other gaseous contaminants, it is preferred that the reaction be carried out in a closed system from which atmospheric and other gases have been removed.

It has now been determined that when conducting the reaction in an aqueous solution in the presence of hydrogen chloride, chlorine and an alkali metal chloride, the reactive species is actually molecular chlorine itself and, thus, the chlorodifluoramine is prepared directly from difluoramine and chlorine.

The objects of this invention are therefore accomplished by a process for the preparation of chlorodifluoramine which comprises reacting difluoramine with chlorine.

The reaction between difluoramine and chlorine is usually complete in a very short period of time. Thus, reaction times for the preparation of chlorodifluoramine may vary from seconds, when all the reactants are initially mixed together, to whatever length of time is required to add the chlorine reactant to the difluoramine, or vice versa. When the reaction is conducted in an aqueous solution, chlorine may be bubbled through a solution of the difluoramine or difluoramine may be added to chlorine water. Alternatively, a solution of difluoramine in water may be added to the chlorine-containing aqueous phase.

As difluoramine decomposes at elevated temperatures, the reaction should be conducted at a temperature where no appreciable decomposition occurs. However, it is preferred to react the chlorine and difluoramine in other than the solid phase. Thus, when operating in aqueous solutions, the freezing point of the solution is a lower limit of practicable temperature. In aqueous solutions, difluoramine tends to hydrolyze at elevated temperatures. Thus, preferred reaction temperatures may vary from about 0° C. to room temperature and above. Temperatures as high as 60° C. and above may be employed. However, the preferred temperature range is from 0° C. to about 20° C., since excellent yields are obtained in this manner.

When employing difluoramine in aqueous solution, the concentration of difluoramine may vary up to 15 percent or more, the upper limit being established by the solubility of difluoramine in water at the reaction temperature. A preferred concentration range for difluoramine solutions is from 1 to 10 percent, and a 5 percent solution of difluoramine is employed in a particularly preferred embodiment of the invention.

The reaction is preferably conducted in an aqueous solution since a smooth rapid reaction results under aqueous conditions. When an aqueous solution is employed, the hydrogen ion concentration should be kept higher than that of pure water. Thus, the reaction is best conducted in an aqueous solution having a pH numerically below 7. The hydrogen ion concentration is important since under basic conditions chlorine in aqueous solution tends to produce hypochlorite ion as a predominant species.

Chlorine may be supplied to the reaction in a variety of methods. The difluoramine may be dissolved in water and chlorine gas bubbled through. Alternatively, an acid solution of chlorine and an alkali metal chloride may be prepared and employed with the difluoramine. Specifically, hydrochloric acid, water, alkali metal chloride, and chlorine may be employed. The alkali metal chloride is not an essential ingredient of the reaction when the chlorine is added sequentially to the reaction as it proceeds. Thus, a solution of hydrochloric acid may be added to the solution of difluoramine and chlorine bubbled through the mixture to produce chlorodifluoramine.

In conducting the reaction between chlorine and difluoramine, it is preferred to employ an excess of chlorine since better utilization of the more expensive starting material difluoramine is thus achieved. However, good results are also obtained when equimolar quantities of the two materials are employed. Furthermore, when desired, the reaction may be conducted with an excess of difluoramine.

The following examples more clearly illustrate the process of this invention.

EXAMPLE 1

To an evacuated reaction vessel equipped with gas inlet and outlet means, heating and cooling means, and pressure measuring means, were added substantially 0.36 part by weight of difluoramine and 400 parts of water. To this was then added substantially 200 parts of ice water, 1.8 parts of HCl, 3.5 parts of $Cl_2$, and 2.9 parts NaCl. Effervescence of the liquid in the reaction vessel was immediately observed. The gaseous components were withdrawn from the reaction vessel and passed through two cold traps maintained at $-142°$ C. and $-160°$ C., respectively, and the chlorodifluoramine was collected in the receiving vessel maintained at $-196°$ C. The amount of product was 0.39 part, equivalent to a 66.7 percent yield, based on the amount of $HNF_2$ used up.

EXAMPLE 2

In the apparatus described in Example 1, and which is additionally equipped with liquid reactant inlet means, is placed 300 parts of a 15 weight percent solution of difluoramine. The vessel is closed and the system evacuated. Chlorine gas is bubbled slowly through the difluoramine solution at 60° C. over a period of 4 hours until 90 parts by weight of chlorine have been contacted with the solution. The chlorodifluoramine in good yield is collected in the receiving vessel at $-196°$ C.

EXAMPLE 3

The procedure of Example 2 is followed using 2000 parts of a one percent difluoramine solution maintained at 0° C. The chlorine (70 parts) is added rapidly to the difluoramine solution in the form of a saturated aqueous solution. A good yield of chlorodifluoramine results.

EXAMPLE 4

Difluoramine, 18 parts in a 5 percent solution, is charged to a reaction system similar to that described in Example 2 and the difluoramine solution maintained at 26° C. A chlorine solution is prepared by saturating dilute hydrochloric acid having a pH of 3 with chlorine and an aliquot of the solution is slowly added to the difluoramine solution. The addition is complete in about 15 minutes and chlorodifluoramine is collected as described in Example 1.

In the apparatus described above, is placed a solution containing 62 parts of chlorine prepared by saturating an aqueous hydrochloric acid solution having a pH of 1 with chlorine gas. To this solution is slowly added 29 parts of difluoramine as a 10 percent solution while the reaction temperature is maintained at 15° C. As in the above examples, a high yield of chlorodifluoramine is obtained.

EXAMPLE 6

The procedure of Example 1 is followed, with the modification that RbCl is used in place of NaCl, the amount of water is substantially 1000 parts and the amount of HCl is substantially 3 parts. The mol ratio of HCl-to-$Cl_2$ is substantially 5:1 and the mol ratio of HCl-to-RbCl is also substantially 5:1. The mol ratio of HCl-to-$HNF_2$ added is substantially 10:1. The temperature of the reactants is maintained at substantially 50° C. in this example. A good yield of $ClNF_2$ is obtained.

Chlorodifluoramine reacts with amines to produce tetrafluorohydrazine, as shown in the following example.

EXAMPLE 7

To an evacuated reaction vessel of the type described in Example 1 were added 6.7 parts by volume of $ClNF_2$ and 11.5 parts by volume of dimethylamine dissolved in 20.8 parts dimethyl ether while maintaining the reaction vessel at temperatures within the range of $-142°$ C. to about 25° C. The components were next allowed to stand at 25° C. for a period of 18 hours during which time a white solid was formed in the liquid phase. The contents of the vessel were then fractionated and analyzed. The solid was found to be mainly dimethylamine hydrochloride. No alkylated hydrazines were present. The fractionation of the volatile products produced ether, 2.3 parts by volume of unreacted amine and 3.2 parts by volume of tetrafluorohydrazine.

EXAMPLE 8

The procedure of Example 7 was repeated with the modification that diethyl ether was substituted for dimethyl ether and the temperature was maintained at $-80°$ C., or lower, during the reaction period. It was found the $ClNF_2$ was nearly quantitatively converted to $N_2F_4$.

EXAMPLE 9

In the apparatus described above, 12.5 parts by volume of dimethylamine was reacted with 4 parts by volume of $N_2F_4$ in the vapor phase at substantially 80° C. for a period of substantially 2 hours. The products upon analysis were found to be methylazide and smaller amounts of diazomethane and azomethane.

Diazomethane is widely used in chemical syntheses.

EXAMPLE 10

In the apparatus described above, 8 parts by volume of $ClNF_2$ were reacted with 7 parts by volume of sodium methoxide at ambient temperatures of substantially 25° C. The products, upon analysis, were found to be a white solid consisting of a combination of sodium chloride and sodium fluoride, and $N_2F_4$. A small amount of another substance was present.

Although the invention has been described in detail, it is to be clearly understood that the same is by way of illustration and example only and is not to be taken by way of limitation, the spirit and scope of this invention being limited only by the terms of the appended claim.

We claim:
1. A method for the preparation of chlorodifluoramine comprising contacting (1) difluoramine with (2) hydrogen chloride in the presence of chlorine, an alkali metal chloride, and water, whereupon chlorodifluoramine is formed.

References Cited

Hoffman et al.: Chem. Reviews, vol. 62, pp. 7 and 17 (1962).

CARL D. QUARFORTH, Primary Examiner

M. J. McGREAL, Assistant Examiner

U.S. Cl. X.R.

23—367